Patented Oct. 17, 1944

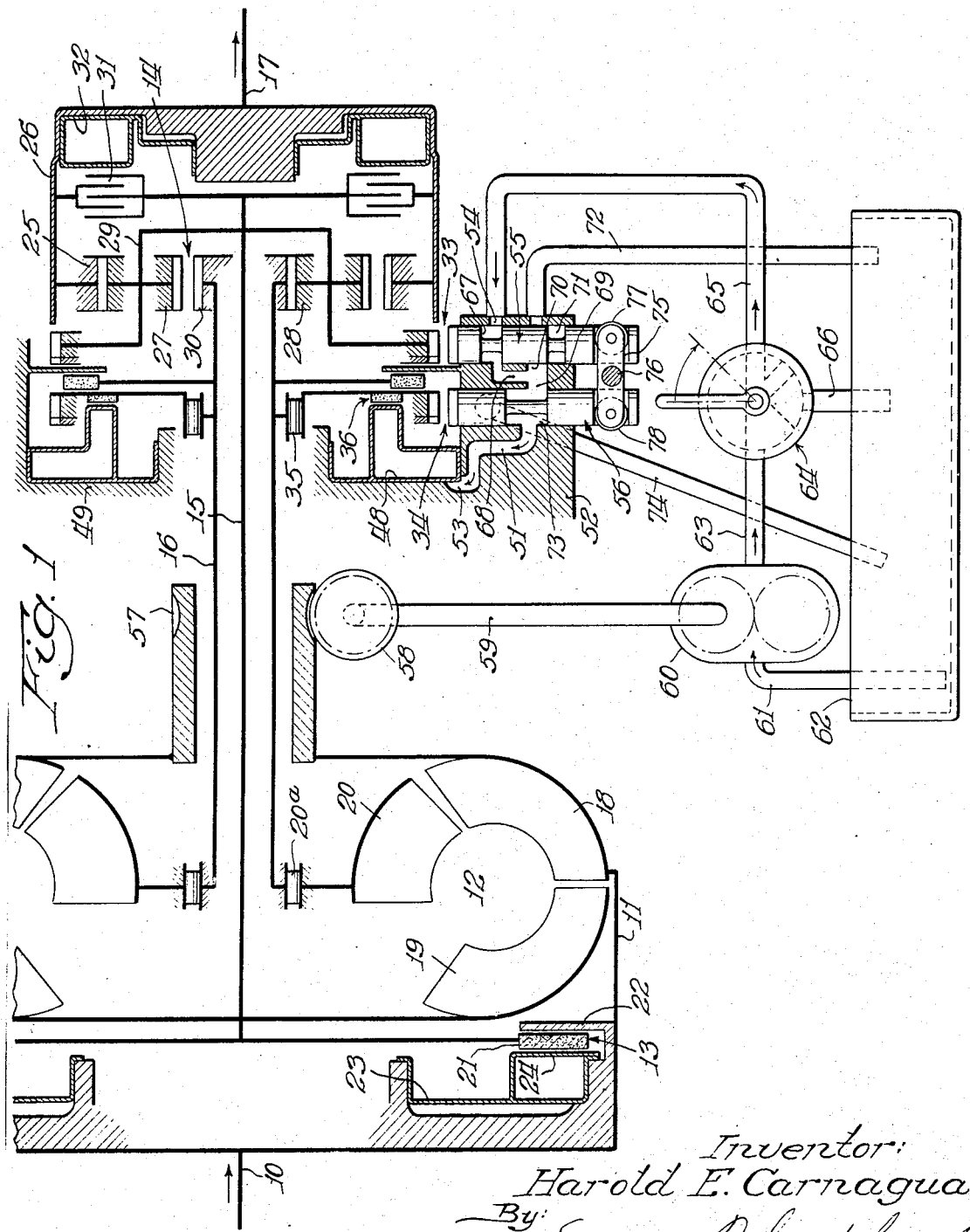

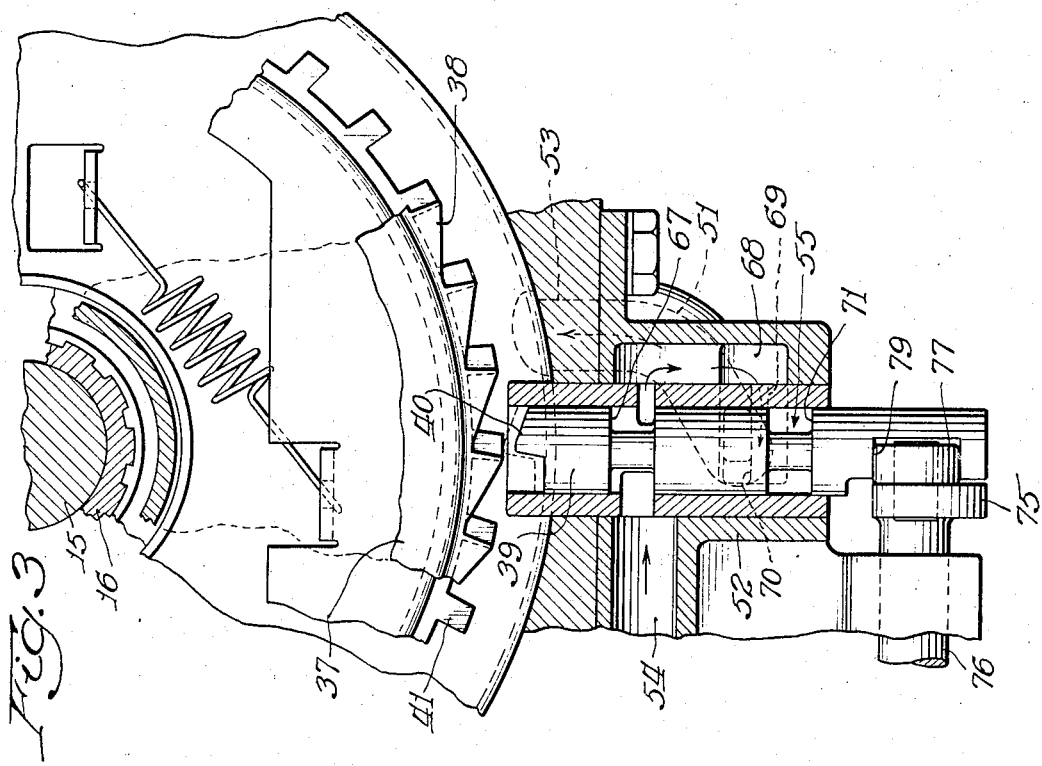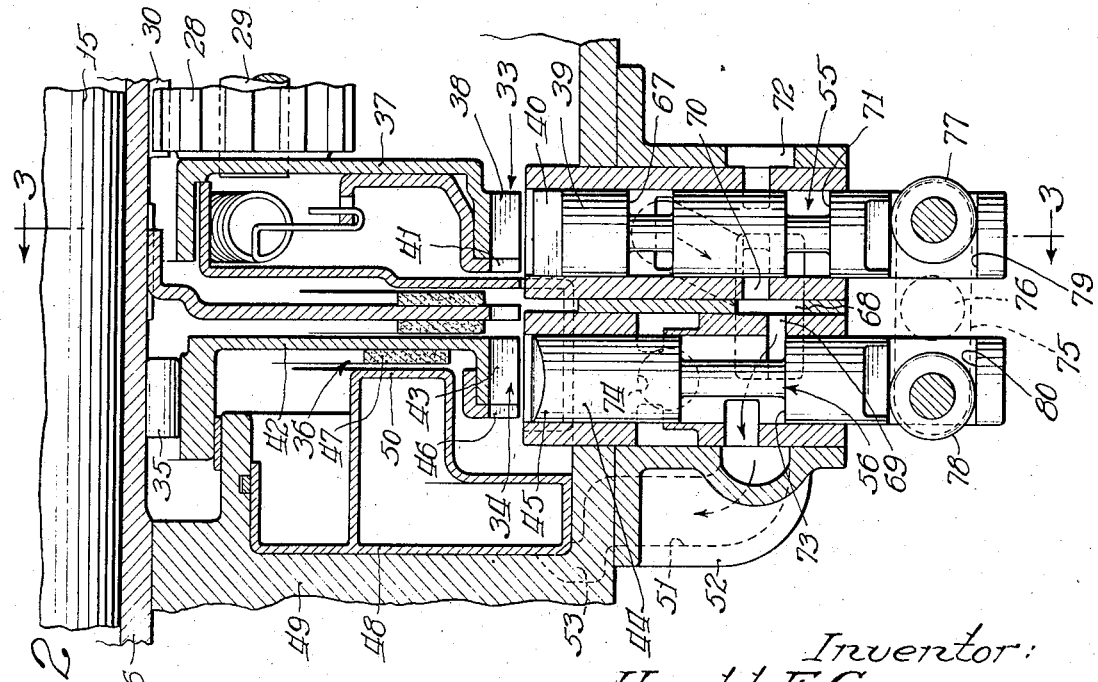

2,360,646

UNITED STATES PATENT OFFICE 2,360,646

CONTROL MECHANISM FOR TRANSMISSIONS

Harold E. Carnagua, Muncie, Ind., assignor to Borg-Warner Corporation, Chicago, Ill., a corporation of Illinois Application January 9, 1942, Serial No. 426,127

13 Claims. (Cl. 74—189.5)

This invention relates to change speed transmissions and particularly to a control mechanism therefor.

In a copending application of John M. Simpson and Harold E. Carnagua, Serial No. 426,122, filed January 9, 1942, is disclosed a transmission for use in an automotive vehicle, the transmission being comprised of a hydraulic power transmitting device combined with gearing to provide a number of speed and torque ratios from an engine to the rear wheels of the vehicle. More specifically, the transmission comprises a hydraulic torque converter wherein the pump element is fixed to the drive shaft and consequently rotates whenever the engine rotates, and a turbine element which is connected to the carrier of a double planetary gear set, the ring gear of the gear set being connected to the driven shaft. Brake means are provided for the sun gear of the planetary gear set in order to establish a low speed, high-torque condition in the transmission, and a similar brake means is provided for the carrier to establish a reverse driving condition in the transmission in conjunction with a reversal of the functions of the turbine and stator elements of the torque converter.

In the Simpson transmission referred to it has been suggested that the sun gear and carrier brake means be comprised of positively interengageable elements, such as ratchet wheels secured to the sun gear and carrier, and individual radially slidable and rotationally fixed pawls for cooperating with the ratchet wheels. When positively interengageable elements are used with such a transmission, however, the engagement of the elements is not very readily effected during the time when the engine is rotating, since even at idling speeds a certain amount of drag torque is transmitted through the converter. This drag torque is impressed upon the carrier, and, because of the reaction of the load on the ring gear, to the sun gear as well.

The principal object of this invention is to provide a control mechanism for positively interengageable brake elements which will permit the elements to engage smoothly and substantially without clash while driving torque is impressed upon one of said elements.

Another object of this invention is to provide an auxiliary connection between two interengageable elements, said connection being controlled by movement of one of the interengageable elements.

Another object of this invention is to provide an auxiliary connection for a plurality of positively interengageable elements, said auxiliary connection being controlled by the joint action of an element in each of the positively interengageable elements.

Another object of this invention is to provide, in a transmission of the type above referred to, an auxiliary brake mechanism for the sun gear, said brake mechanism being operated by fluid pressure and controlled by movement of the radially slidable pawl for arresting the rotation of the sun gear.

A still more specific object of this invention is to provide a ratchet and pawl brake mechanism for a transmission wherein the ratchet is subjected to drag torque, with hydraulically controlled brake means for momentarily arresting the rotation of the wheel, said hydraulically controlled brake means being controlled by a valve constructed in the stem of the pawl.

These and other objects and features of this invention will become apparent from the following description when taken together with the accompanying drawings in which:

Fig. 1 is a schematic fragmentary elevation in section of a transmission of the type disclosed in the aforementioned Simpson application showing how this invention may be applied thereto;

Fig. 2 is an enlarged fragmentary elevation of the novel control means; and

Fig. 3 is a fragmentary rear elevation in section taken through the control means along lines 3—3 of Fig. 2.

Referring now to Fig. 1 for a brief description of the transmission to which this invention may be applied, drive shaft 10, which may be the crank shaft of an engine (not shown), is connected to a housing 11 which drives a hydraulic torque converter 12 and a friction clutch 13. Said torque converter 12 is connected to a planetary transmission 14 by means of an intermediate shaft 15 and a hollow shaft 16. Planetary gear set 14 is in turn connected to a driven shaft 17.

Torque converter 12 is comprised of a pump element 18, a turbine element 19 and a stator element 20. Pump element 18 is directly connected to, and driven by, housing 11. Turbine element 19 is directly connected to intermediate shaft 15, and stator element 20 is connected by means of a one-way clutch 20a to hollow shaft 16.

Friction clutch 13 is comprised of a driven disc 21 directly connected to, and rotatable with, intermediate shaft 15; a reaction flange 22 directly connected to housing 11, and a piston type operator 23 having a pressure member 24 adapted to cooperate with disc 21 to drive the latter. It will be observed that when friction clutch 13 is engaged, drive shaft 10 is directly connected to intermediate shaft 15 which, in effect, connects pump element 18 of the hydraulic torque converter 12 to turbine element 19 independently of the fluid.

Planetary gear set 14 is comprised of a ring gear 25 connected by means of a drum 26 to driven shaft 17, a plurality of intermeshing planet gears 27 and 28 mounted on a carrier 29 and a sun gear 30 directly connected to hollow shaft 16. Planet pinions 27 and 28 are so arranged that planet pinion 27 meshes with ring gear 25, and planet pinion 28 meshes with planet pinion 27 and also with sun gear 30.

The controls for planetary gear set 14 comprise a clutch 31 adapted to be operated by hydraulic piston 32 and when operated serving to connect intermediate shaft 15 with drum 26 which, in effect, locks up the gear set; a brake 33 adapted to arrest the rotation of carrier 29 and thereby intermediate shaft 15 and turbine 19 of the hydraulic torque converter 12; and brake 34 which, through the intermediary of a one-way brake 35, is adapted to arrest the rotation of hollow shaft 16, sun gear 30 and stator 20.

The operation of the transmission is as follows: Neutral is secured by releasing all clutches and brakes. Assuming, however, that driven shaft 17 is connected to a load, and drive shaft 10 is rotating at idling speed, the drag torque developed in torque converter 12 at such idling speed will be transmitted to intermediate shaft 15 and carrier 29, thereby tending to rotate the latter at some predetermined speed. With ring 25 stationary and carrier 29 rotating, sun gear 30 will also rotate when the engine is idling. For low speed forward, brake 34 is applied which provides a reaction point for sun gear 30 and stator 20. The drive will then be through torque converter 12 at a multiplied torque, intermediate shaft 15 and planetary gear set 14, again at a multiplied torque, to drum 26 and driven shaft 17. At some predetermined speed, clutch 31 is engaged to eliminate the torque multiplication through gear set 14 and the drive is then through the torque converter 12 with multiplied torque, intermediate shaft 15 and clutch 31 to drum 26 and driven shaft 17. It will be noted that when clutch 31 is locked up the entire planetary gear set 14 rotates as a unit, including sun gear 30, and the rotation of sun gear 30 is made possible by the automatic release of brake 34 through one-way brake 35. At a predetermined higher speed, clutch 13 in housing 11 is engaged which then provides a direct connection between drive shaft 10, intermediate shaft 15 and thence through clutch 31 to drum 26 and driven shaft 17. For reverse drive, brake 33 is applied and all other brakes and clutches are released. When brake 33 is applied, carrier 29, intermediate shaft 15 and turbine element 19 are held against rotation and hollow shaft 16 and stator 20 are free to rotate. It is a characteristic of hydraulic torque converters of the type described that when the functions of the turbine and stator elements are interchanged the stator element will be driven in a reverse direction, thereby establishing a reverse drive through the converter. Thus hollow shaft 16 is driven in a reverse direction and with it sun gear 30. Due to the double planet arrangement in planetary gear set 14, ring gear 25 will likewise be driven in a reverse direction, thereby establishing a reverse drive in drum 26 and driven shaft 17.

In order to conserve power and increase the efficiency of the transmission, brakes 33 and 34 are preferably manually operated and of the positively interengageable type, such that no power is required to keep them operated. In view of the drag torque imposed upon carrier 29 and sun gear 30, however, the engagement of the positively interengageable elements of brakes 33 and 34 would normally result in considerable noise and might in fact be difficult of achievement. For this reason an auxiliary brake 36 is employed which serves to arrest the rotation of the rotatable element of brake 34 momentarily just prior to the operation of said brake 34. Brake 36 is of the friction type and hence may be applied under torque. It is also automatically controlled and operated by means of hydraulic pressure derived from a system of valves and conduits hereinafter to be described. It will be noted here that with a load on driven shaft 17 such that said shaft is stationary and hence drum 26 and ring gear 25 are likewise stationary, the braking of sun gear 30 likewise results in the braking of carrier 29 and hence arrests the rotation of brake 33 to facilitate the engagement of the positively interengageable element thereof. Since brake 36 is a friction brake and hence may arrest the rotation of sun gear 30 in any angular position, and since brake 34 is of the positively interengageable type and hence cannot be engaged except when the elements thereof are properly aligned, the operation of brake 36 and brake 34 must be coordinated in such a manner that brake 36 will not hold sun gear 30 against rotation indefinitely and thereby prevent brake 34 from operating if the elements of the latter should be butt ended. The same applies to brake 33 since the latter is likewise dependent upon alignment of its elements for a successful engagement. The details of brakes 33, 34 and 36 and the means for coordinating the operation of these brakes will now be detailed.

Referring now to Figs. 2 and 3 it will be observed that brake 33 is comprised of a ratchet wheel 37 secured to carrier 29 and provided at its periphery with ratchet teeth 38. Said teeth 38 are adapted to be engaged by a rotationally fixed radially slidable pawl 39 having a tooth 40 which is adapted to engage a tooth 38 on ratchet wheel 37. In order to prevent a partial engagement of pawl 39 with the wheel 37, a blocker 41 is provided the details of which are described in a copending application of John M. Simpson, filed January 9, 1942, Serial No. 426,125. The function of blocker 41 is to prevent the radial inward movement of tooth 40 except at a predetermined distance behind the tooth which it is to engage, thereby insuring sufficient time and space to permit tooth 40 of the pawl to move inward to substantially fully engaged position.

Brake 34 is similar to brake 33 and is likewise comprised of a wheel 42 having ratchet teeth 43 around the periphery thereof and adapted to be engaged by a rotationally fixed radially slidable pawl 44. Said pawl 44 is provided with a tooth 45 in the end thereof which is adapted to engage a tooth 43 of wheel 42 to arrest the rotation of the latter. A blocker 46, similar in function to blocker 41, is likewise provided to prevent a partial engagement of tooth 45 with a tooth 43.

Brake 36 is comprised of a friction facing 47 cemented to the side of ratchet wheel 42 and a piston 48 fixed against rotation in housing 49 and provided with a pressure member 50 adapted to cooperate with friction facing 47 to arrest the rotation of wheel 42. Piston 48 is operated by fluid pressure which is admitted behind said piston by means of a conduit 51 in a valve block 52, said conduit 51 communicating with a conduit 53 in housing 49. Oil under pressure is admitted to a passageway 54 in valve block 52 and then is directed by means of valves 55 and 56 to conduit 51. In order to obtain the proper coordinated action between valves 55 and 56 and pawls 39 and 44, the valves are made to move with their respective pawls and in fact may be made from a single piece of metal.

Referring again to Fig. 1 for a description of the hydraulic circuits involved, housing 11 drives a worm gear 57 which in turn drives a wheel 58, a shaft 59 and a pump 60. Said pump 60 is provided with an inlet conduit 61 the free end of which is submerged in oil or other fluid contained in a sump 62, and with an outlet conduit 63 through which oil under pressure is fed to a control valve 64 and thence, either to conduit 65 leading to passageway 54 in valve block 52, or to a dump conduit 66 which returns the oil to sump 62. Valve 55 is provided with an upper porting 67 which is adapted to conduct fluid from passageway 54 to an interconnecting conduit 68 in the valve block. Said conduit 68 has two branches, one of which 69 conducts the oil to valve 56 and the other 70 of which is adapted to be connected through a lower porting 71 in valve 55 to a dump conduit 72 leading to sump 62. Valve 56 is provided with a single port 73 which in one position of the valve connects conduit 69 and with conduit 51 to admit oil under pressure behind piston 48, and in another position of the valve cuts off conduit 69 and connects conduit 51 with a dump conduit 74 leading to sump 62.

The various conduits and portings of the valve as proportioned for a practical installation are disclosed in Figs. 2 and 3. When the valves are positioned as shown in Figs. 1 and 2, which correspond to a neutral setting of the valves, fluid under pressure may be admitted through valve 55 interconnecting conduit 68, conduit 69, valve 56 and conduit 51 to piston 48, thereby to operate brake 36 and arrest the rotation of ratchet wheel 42. By virtue of the relation between sun gear 30, ring gear 25 and the interconnecting planet pinions 27 and 28 as described above, carrier 29 will also be held against rotation so that the transmission may be conditioned either for forward or reverse operation without producing any undue clash. Assuming that forward drive is to be made effective, valve 56 is moved upward, thereby moving pawl 44 toward engagement with ratchet wheel 42. Should the ratchet teeth and pawl be butt-ended at this point, or should the pawl be blocked by blocker 46, the pawl will be prevented from moving further into engagement with teeth 43. However, in the butt-ended position of the pawl, conduit 74 is partially uncovered, thereby permitting the pressure behind pistons 48 to be reduced sufficiently to permit the brake to slip. With the brake partially released, the drag torque in intermediate shaft 15 will begin to rotate ratchet wheel 42, and at some point, the butt-ended condition will no longer exist, in this manner permitting a complete engagement of pawl 44 with ratchet wheel 42. The full engagement thus effected uncovers conduit 74 and permits a complete reduction in pressure of the fluid behind piston 48, completely releasing brake 36. At this point conduit 69 is completely blocked off by the lower portion of valve 56 so that fluid under pressure cannot enter conduit 51.

When it is desired to condition the transmission for reverse drive, valve 55 is moved upward so as to move pawl 39 into engagement with ratchet wheel 37. The upward movement causes porting 71 to align conduit 70 with conduit 72 to bleed pressure from behind piston 48 and to effect at least a partial release of brake 36. The bleeding commences just as soon as a butt-ending condition occurs. As in the case of forward drive, the partial release of brake 36 allows the drag in intermediate shaft 15 to rotate carrier 29 slightly with respect to pawl 39, and at some point the butt-ended condition will no longer exist and pawl 39 will move into complete engagement with a tooth 38 of ratchet wheel 37. When so completely engaged, inlet porting 54 is completely blocked off so that no fluid under pressure enters the valve block, and such fluid as may be entrapped in the valve block and behind piston 48 is conducted through conduit 72 into sump 62, thereby completely releasing brake 36.

It is understood of course, that suitable pressure relief valve will be provided in the hydraulic circuit and that a suitable control will be provided for valve 64 so that fluid at the right pressure will be available at the valve when necessary.

It will be noted that the operation of valve 55 must be coordinated with that of valve 56 for two reasons, one of which being to effect a proper distribution of fluid, and the other being to render impossible a simultaneous setting of the transmission in forward and reverse driving ratios. The operation of valves 55 and 56 must also be coordinated with that of pawls 39 and 44 to insure a proper sequence of operation of brake 36 and the pawls. This simultaneous actuation of the valves and pawls is brought about by means of a lever 75 which is pivoted at 76 and is provided with rollers 77 and 78 operating in transverse grooves 79 and 80 in valves 55 and 56 respectively. Said shaft 76 may be connected to some external control which is manually operated and which may take the form of a lever at the steering column of the vehicle.

It is apparent from the foregoing description that the means described above provides a control for one or more brakes of the positive type and an auxiliary brake of the friction type which coordinates the functions of said brakes in a manner to permit engagement of the positive brakes substantially without clash and with perfect coordination between the operation of the positive brakes and the auxiliary brake.

It is understood that the foregoing description is merely illustrative of a preferred embodiment of the invention and that the scope of the invention therefore is not to be limited thereto but is to be determined by the appended claims.

I claim:

1. In combination, a rotatable element, a rotationally fixed structure, a pawl slidably disposed in said structure to move radially with respect to said rotatable element and adapted to positively engage the rotatable element, auxiliary means for arresting the rotation of said element, and means controlled by movement of said pawl for controlling the auxiliary means such that the auxiliary means is rendered ineffective when the engagement of the pawl is complete.

2. In combination, a rotatable toothed wheel, a rotationally fixed structure, a toothed pawl slidably disposed in said structure to move radially with respect to said wheel and adapted to engage said wheel, a friction brake for arresting the rotation of said wheel, and means controlled by movement of said pawl for controlling the operation of the friction brake, such that the friction brake is rendered ineffective when the engagement of the pawl with the wheel is complete.

3. In combination, a rotatable toothed wheel, a pawl adapted to engage said wheel, a fluid operated friction brake for arresting the rotation of said wheel, and a valve for controlling the fluid operated brake, said valve being movable with said pawl and having portings such that during the initial movement of the pawl towards engaged position, the fluid operated brake will be operative and will be released just prior to the engagement of the pawl and wheel.

4. In combination, a rotatable toothed wheel, a pawl adapted to make engagement with said wheel, a fluid operated friction brake for arresting the rotation of said wheel, valve means for controlling the fluid operated brake, said valve means being integral with the pawl, and a source of fluid pressure for operating the fluid operated brake, said valve having portings which admit fluid to the fluid operated brake upon the initial movement of the pawl and then dump the fluid when the pawl is butt-ended with the wheel.

5. In combination, a pair of rotatable elements, said elements being interconnected to rotate simultaneously, positive brake means for each of said elements, auxiliary fluid operated means for arresting the rotation of said elements, a source of fluid under pressure for operating said auxiliary means, and valve means for controlling the flow of fluid to said auxiliary means, said valve means comprising a valve movable with one of said positive brake means, a second valve movable with the other of said positive brake means, and manually operable means for simultaneously actuating both of said positive brake means for selectively braking one or the other of said rotatable elements, said valves having portings such that the auxiliary means is operated prior to the operation of either of said positive brake means.

6. In combination, the combination as described in claim 5, said rotatable elements being toothed wheels and said positive brake means being pawls, and a blocker element on each of said wheels for limiting the engagement of the respective pawl with the wheel to substantially full engagement, the valves having portings which relieve the auxiliary means when a pawl is blocked, whereby to permit the wheel to move to a non-blocking position.

7. In a change speed transmission, the combination of an input shaft, an output shaft, a pair of positively interengageable brake elements for completing a power train between said shafts, said power train including a hydrodynamic power transmitting device capable of slipping whereby the elements of said brake may be held from relative rotation against the action of said device to facilitate engagement of the brake when said output shaft is stationary and said input shaft is rotating, auxiliary means acting directly between the elements of said brake for holding the brake elements from such relative rotation for thereby completing said power train, and means controlled by movement of one of the brake elements for controlling the auxiliary means such that the auxiliary means is rendered ineffective when the engagement of the elements is complete.

8. In a change speed transmission, the combination of an input shaft, an output shaft, a brake for completing a power train between said shafts, said brake comprising a rotatable element and a rotationally fixed element adapted to engage the rotatable element, said power train including a power transmitting device capable of slipping whereby said rotatable element may be held from rotation against the action of said device to facilitate engagement of the brake when said output shaft is stationary and said input shaft is rotating, an auxiliary brake acting on said rotatable element for arresting its rotation for thereby completing said power train, and means controlled by movement of said rotationally fixed brake element for controlling the operation of the auxiliary brake such that the auxiliary brake is rendered ineffective when the engagement of the first mentioned brake is complete.

9. In a change speed transmission, the combination of an input shaft, an output shaft, a brake for completing a power train between said shafts, said brake comprising a rotatable toothed wheel and a radially movable rotationally fixed toothed element adapted to engage the rotatable wheel, said power train including a hydrodynamic coupling device capable of slipping whereby said wheel may be held from rotation against the action of said device to facilitate engagement of said brake when said output shaft is stationary and said input shaft is rotating, a friction brake acting on said wheel for holding it from rotation for thereby completing said power train, and means controlled by movement of the radially movable toothed element for controlling the operation of the friction brake such that the friction brake is rendered ineffective when the engagement of the first-mentioned brake is complete.

10. In a change speed transmission, the combination of an input shaft, an output shaft, a brake for completing a power train between said shafts, said brake comprising a rotatable element and a manually operable rotationally fixed element adapted positively to interengage, said power train including a power transmitting device capable of slipping whereby said rotatable element may be held stationary against the action of said device to facilitate engagement of the positively interengageable elements when said output shaft is stationary and said input shaft is rotating, an auxiliary fluid operated brake acting on said rotatable element for holding it from rotation for thereby completing said power train, and a valve for controlling the fluid operated brake, said valve being movable with the manually operable element and having portings such that during the initial movement of the manually operable element toward engaged position the fluid operated brake will be operative and will be released just prior to the engagement of the first mentioned brake.

11. In a change speed transmission, the combination of an input shaft, an output shaft, a manually controlled brake for completing a power train between said shafts, said brake including a rotatable element and a manually operable rotationally fixed element interengageable therewith, said power train including a hydrodynamic coupling device capable of slipping whereby said rotatable element may be held fixed against the action of said device to facilitate engagement of the elements when said output shaft is stationary and said input shaft is rotating, an auxiliary fluid operated friction brake acting on said rotatable element for holding it from rotation for thereby completing said power train, valve means for controlling the fluid operated brake, said valve means being integral with the manually operable element, and a source of fluid pressure for operating the fluid operated brake, said valve having portings which admit fluid to the fluid operated brake upon the initial movement of the manually operable element and then dump the fluid when the manually operable element is butt-ended with the rotatable element.

12. In a change speed transmission, the combination of an input shaft, an output shaft, a hydrodynamic coupling device driven by said input shaft, a planetary gear set operatively disposed between said hydrodynamic device and said output shaft, positively interengageable means for arresting the rotation of one of the elements of the gear set for completing a power train between the shafts, positively interengageable means for arresting the rotation of another element of said gear set for completing another power train between said shafts, said hydrodynamic coupling device being capable of slipping whereby either of said gear set elements may be held from rotation against the action of the hydrodynamic device to facilitate engagement of either of the positively interengageable means when said output shaft is stationary and said input shaft is rotating, auxiliary fluid pressure operated means acting directly on one of said elements for holding it against rotation for thereby completing one of said power trains and for holding the other of said elements against rotation when said output shaft is stationary, a source of fluid under pressure for operating said auxiliary means, and valve means for controlling the flow of fluid to said auxiliary means, said valve means comprising a valve movable with said first mentioned positively interengageable means, and manually operable means for mutually exclusively operating the first and second positively interengageable means, said valves having portings such that the auxiliary means is operated prior to the operation of either of said positively interengageable means.

13. In a change speed transmission, the combination as described in claim 12, each of said positively interengagebale means comprising a ratchet wheel and a pawl, and a blocker element on the wheel for limiting the engagement of the pawl with the wheel to substantially full engagement, the valves having portings which release the auxiliary means when the pawl is blocked, whereby to permit the ratchet wheel to move to a non-blocking position.

HAROLD E. CARNAGUA.